United States Patent [19]

Levinson

[11] 4,419,713
[45] Dec. 6, 1983

[54] MULTIPLE ELECTRODE SERIES CAPACITOR

[75] Inventor: Solomon Levinson, Forest Hills, N.Y.

[73] Assignee: Centre Engineering, Inc., State College, Pa.

[21] Appl. No.: 281,010

[22] Filed: Jul. 6, 1981

[51] Int. Cl.³ .............................................. H01G 4/42
[52] U.S. Cl. .................................... 361/321; 361/330
[58] Field of Search ........................ 361/304, 321, 330

[56] References Cited

U.S. PATENT DOCUMENTS

| | | | |
|---|---|---|---|
| 2,389,420 | 11/1945 | Deyrut | 361/321 |
| 3,253,199 | 5/1966 | Cozens | 361/330 X |
| 3,483,453 | 12/1969 | Meyers | 361/330 |
| 3,721,871 | 3/1973 | Heron | 361/330 |
| 4,247,881 | 1/1981 | Coleman | 361/321 |

FOREIGN PATENT DOCUMENTS

| | | | |
|---|---|---|---|
| 150465 | 11/1935 | Fed. Rep. of Germany | 361/330 |
| 645573 | 7/1952 | United Kingdom | 361/304 |

OTHER PUBLICATIONS

Birks Modern Dielector Matorias Hotwood Co. 1960 London p. 13.

*Primary Examiner*—Donald A. Griffin
*Attorney, Agent, or Firm*—Berger & Palmer

[57] ABSTRACT

This specification discloses a multigap series construction for multiple electrode monolithic capacitor structures employing ceramics. The voltage rating of such capacitors increases with each gap added across the dielectric. Additionally, the amount of piezoelectric activity occurring in a piezoelectric dielectric is limited by the series gap arrangement to be below that which causes deleterious spurious signals to be generated when said capacitor vibrates.

10 Claims, 7 Drawing Figures

FIG. 1
PRIOR ART
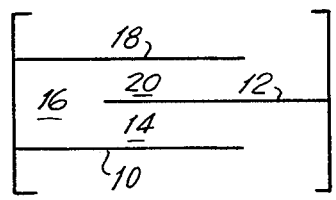
FIG. 2
PRIOR ART
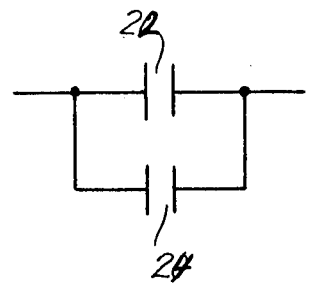
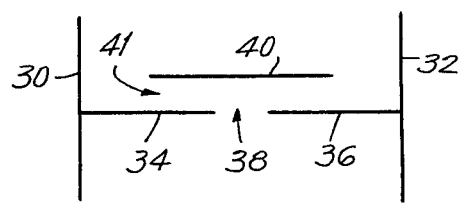
FIG. 3
PRIOR ART
FIG. 4
PRIOR ART
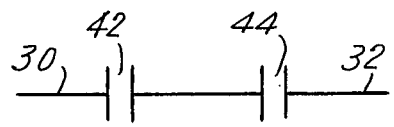
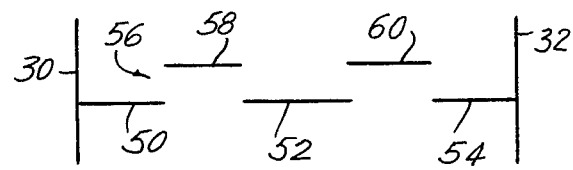
FIG. 5

MULTIPLE ELECTRODE SERIES CAPACITOR

BACKGROUND OF THE INVENTION

This invention relates to monolithic multilayer capacitor structures, and more particularly, to such structures employed for high voltage applications. Additionally, this invention relates to minimizing generation of spurious signals in vibrating capacitors employing piezoelectric materials as dielectrics.

High voltage ceramic capacitors are widely available. These are generally constructed of electrode plates sandwiched around a dielectric formed of a ceramic material. The size and characteristics of the dielectric help determine the value of the capacitance, and high voltage capacitors rated in excess of 10 kV are very bulky, costly and limited in use because of their size. An example of such a high voltage ceramic capacitor is shown in U.S. Pat. No. 3,946,290.

Monolithic ceramic multiple electrode capacitor assemblies are widely used in the electronics industry. Such capacitors are either constructed as parallel or series assemblies. When parallel multiple electrode capacitor assemblies are formed, electrodes embedded in a monolithic medium extend inwardly from opposite edges with a dielectric material sandwiched between the opposite electrodes. By building alternate layers of such electrodes and connecting common electrodes at the side edges, a multiple electrode parallel capacitor assembly is formed.

In a series capacitor assembly, spaced-apart aligned electrodes extend inwardly from opposite edges toward each other and terminate in a gap. A floating electrode separated from the spaced-apart electrodes by a gap in the dielectric medium bridge the electrodes to form the series construction.

Such multiple electrode capacitor assemblies have their stress points at the edges of the electrodes as well as between electrode layers. The voltage rating of such capacitors is limited by this stress, which limits the dielectric withstanding voltage. For most dielectric materials, the dielectric withstanding voltage rating generally decreases per unit thickness with increasing dielectric thickness, but the overall total dielectric withstanding voltage increases. Therefore, relatively thick dielectrics are required for high voltage applications.

Prior art monolithic multiple electrode parallel capacitors also suffer from potential catastrophic breakdown when dielectric failure occurs between the electrodes. Since these capacitors are connected in parallel, such dielectric failure effectively destroys or severely alters the capacitor characteristics. These alterations tend to detract from the reliability of such capacitors.

Multiple electrode capacitor assemblies also suffer from practical design constraints which affect the ability to produce capacitors having predicted capacitance ratings. This is due to difficulty in accurately controlling dielectric thickness, electrode area and the dielectric characteristics which are influenced by the sintering process employed for monolithics.

Frequently, capacitor structures are formed by electrically joining individual capacitors. Such structures suffer from the inherent disadvantages attendant such assembly techniques in which a number of joints are employed, thereby detracting from the reliability of such assemblies.

It also has been found that unwanted spurious signals are generated in multi-layer type capacitors when such capacitors utilize piezoelectric material as the dielectric ceramic and the capacitor is subjected to vibratory action. These spurious signals occur because of the nature of the piezoelectric material. Since these capacitors may be used in aerospace applications, it can be understood that minimizing such spurious signals is important.

In an article entitled *Piezoelectric Properties of Internally Electroded PZT Multilayer Capacitors* appearing in the magazine Ferroelectrics, 1980, Volume 27, pp. 59–62, it has been posited that a pinning effect exists for parallel multielectrode construction using a piezoelectric as a dielectric. The pinning effect may occur at the edges of the electrodes in the parallel electrode capacitor construction.

An object of this invention is to provide a high voltage monolithic capacitor which is relatively small in size.

Another object of this invention is to provide a high voltage rated monolithic multiple electrode capacitor assembly.

Still another object of this invention is to provide such a capacitor construction in which the rated capacitance value is more effectively and accurately achieved.

Another object of this invention is to provide such a capacitor construction whose reliability is enhanced.

Still another object of this invention is to provide a multiple electrode capacitor assembly employing a piezoelectric dielectric in which the amount of vibratory movement of the piezoelectric dielectric is limited to reduce the emission of unwanted spurious signals generated by the vibrating action.

Other objects, advantages and features of this invention will become more apparent hereinafter.

SUMMARY OF THE INVENTION

In accordance with the principles of this invention, the above objects are accomplished by providing a monolithic series capacitor assembly in which the gap size between the floating electrode and outer electrodes pins the vibratory movement of the piezoelectric dielectric to be below the level at which detrimental spurious signals are generated.

As a further feature of this invention, a small size high voltage capacitor structure is provided by utilizing a series construction employing multiple gaps across a single dielectric medium. Each gap across the dielectric increases the voltage rating, since the equivalent circuit of such a construction is one of capacitors in series. The capacitance value of the capacitor is raised by adding additional alternate layers and by extending the electrodes in the third dimension (along the depth of the capacitor). By connecting the capacitor elements in series, the voltage rating can be significantly increased.

Since a large number of individual capacitor subsections are used to form the multiple electrode capacitor of this invention, the reliability of the capacitor is increased. Additionally, since an increased number of subsections are combined, the significance of a variation in any single subsection is minimized, thereby enabling the design capacitance value to be more closely realized. Still further, since the electrodes are formed in a single structure, the need for separate joints connecting the individual capacitor subsections is eliminated.

As a feature of this invention, the use of the series multiple electrode monolithic capacitor construction minimizes the problem of catastrophic failure attendant the prior art. Thus, if one subsection in a series circuit fails, the value of the total series capacitance circuit will be changed, but there will not be a short-circuiting of the other capacitor circuits.

As a further feature of this invention, the series construction enables the stress at the dielectric layers to be reduced.

Another feature of this invention is the ability to provide high voltage-reduced capacitors with relatively small sized dielectrics. This occurs because the dielectric strength per unit thickness (volts/mil) employed in thinner dielectrics is higher than with thicker dielectrics, and the designer can design a more efficient capacitor structure because he can utilize the higher strength per unit thickness which is available for the dielectric.

BRIEF DESCRIPTION OF THE DRAWINGS

FIG. 1 is a cross-sectional view of a prior art multiple electrode parallel capacitor assembly.

FIG. 2 is an equivalent circuit of the capacitor assembly of FIG. 1.

FIG. 3 is a cross-sectional view of a prior art multiple electrode series capacitor assembly.

FIG. 4 is an equivalent circuit of the capacitor assembly of FIG. 3.

FIG. 5 is a sectional side view showing one embodiment of a high voltage multigap capacitor of this invention.

DETAILED DESCRIPTION

Figure 6:
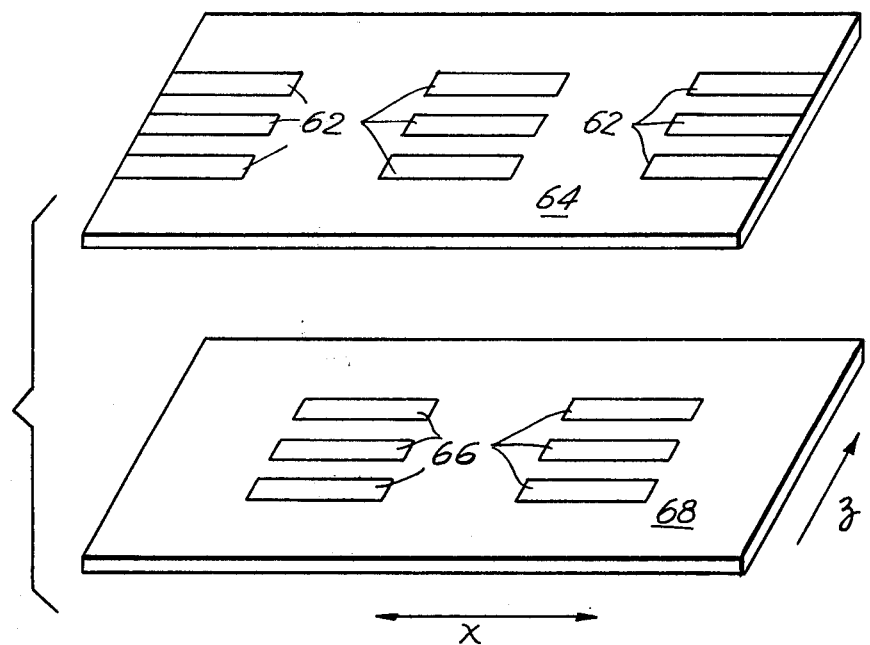
FIG. 6 is an exploded perspective view of another embodiment of this high voltage multigap capacitor invention.

FIG. 1 is a cross-sectional view of a multiple-electrode monolithic ceramic parallel capacitor assembly of the prior art. Electrodes 10 and 12 embedded in a dielectric medium 16 and are parallel to each other and spaced apart by gap 14. These electrodes are connected at their outer edges to an electrical circuit, and a capacitor is formed by electrodes 10 and 12 and the dielectric 14. Another electrode 18, parallel to and aligned with electrode 10 is located above electrode 12 and spaced therefrom by a gap 20 formed in dielectric 14. Thus, two parallel capacitors 22 and 24 are formed as shown in FIG. 2, with gaps 14 and 20 located between respective electrodes. Electrodes 10 and 18 are electrically joined together at their outer common edge.

FIG. 3 is a cross-sectional view of a conventional prior art series monolithic multiple electrode capacitor assembly. Each side edge 30 and 32 of the capacitor structure is electrically connected to respective inwardly disposed spaced-apart electrodes 34 and 36. A gap area 38 is formed between the electrodes. A floating electrode 40 is located above the pair of spaced-apart electrodes and the three electrodes are embedded in a dielectric medium 41.

The equivalent circuit of the series multiple electrode assembly of FIG. 3 is shown in FIG. 4. In particular, two capacitors 42 and 44 are formed in series across the structure. Each capacitor is formed by the overlap area between the floating electrode and spaced-apart electrodes and the dielectric medium therebetween. Maximum dielectric stress occurs at the tip of each edge of the floating electrode. This stress limits the voltage rating of the capacitor. The total capacitor value is determined by the number of repetitive layers shown in FIG. 3 in which each floating electrode 40 and pairs of spaced-apart electrodes 34 and 36 are repeated. The spaced-apart electrodes are each joined with other similarly disposed parallel spaced-apart electrodes at their outer edges to form the capacitor structure.

As described above, the voltage rating for parallel and series multiple electrode capacitor assemblies is limited by the dielectric stress at the tips of the floating electrode and the dielectric layer thickness. FIG. 5 is a cross-sectional view of an embodiment of this invention in which a high voltage rating for a multiple electrode capacitor structure is realized. The high voltage rating is achieved by employing a multigap series monolithic capacitor construction embedded within a single dielectric material. In particular, a plurality of aligned spaced-apart electrodes 50, 52 and 54, (at least three in number) are spaced apart across the width of dielectric medium 56 with gaps formed between each pair of electrodes. Each gap area between each pair of adjacent electrodes 50 and 52 and 52 and 54 is bridged by a respective floating electrode 58 and 60 separated by a gap from each pair of spaced-apart electrodes. The capacitance value formed between each set of floating and spaced-apart electrodes is determined by the size of each electrode, the overlap area between electrodes, the materials used, the dielectric thickness and the gap sizes. By providing a multi-gap series construction embedding the electrodes in a single dielectric material, the rating of the capacitor may be raised by increasing the numbers of gaps. Of course, the overall capacitance value is decreased for each additional gap employed, but the capacitance value may be raised with additional layers.

One approach to enhancing capacitor value while increasing capacitor voltage rating is shown in FIG. 6 in which spaced-apart electrode plates 62 are attached (by silk screening or the like) to a dielectric 64. Electrodes 66 are silk screened onto the next dielectric plate 68 which will be stacked against dielectric plate 64. By selectively locating the electrodes 62 and 66, a plurality of multigap series capacitor structures are formed across the dielectric with electrodes 66 serving as the floating electrode. The final capacitor structure is achieved by conventionally processing the resulting laminate.

Figure 7:
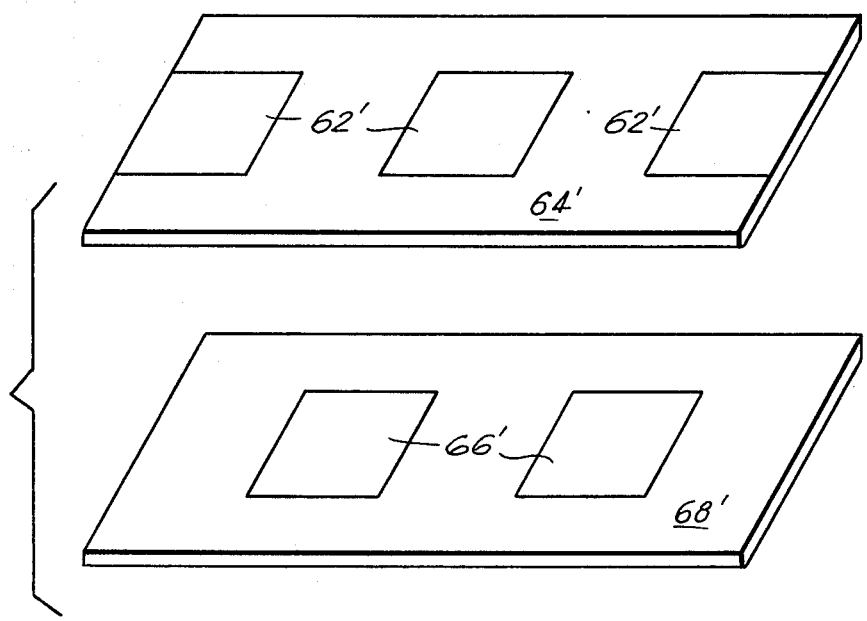
FIG. 7 is another embodiment of the capacitor structure shown in FIG. 6.

FIG. 6 shows a 3×2 matrix structure, which forms six capacitor subsections. As an alternative arrangement, plates 62 in the z direction need not be separated and the size of the plates will be increased by filling the gap areas between adjacent plates and thus the overlap areas (see FIG. 7). Indeed, the plates 62 may extend nearly edge to edge of the dielectric 64 in the z direction to increase electrode size and capacitance value. Although a 2×3 matrix structure is shown in FIG. 6, this invention is not so limited. It is understood that the total capacitor value will be influenced by the number of stacked dielectric layers.

The capacitor of this invention may use any suitable ceramic dielectric formulation. The use of the multiple series construction allows for increased reliability because of the increase in the number of subsections which form the capacitor. Further, failure of any one subsection will not catastrophically degrade the capacitor as is the case with parallel multiple electrode construction.

The series construction of this invention also serves to permit a reduction in the dielectric thickness between adjoining electrodes which form the capacitor. Since the dielectric thickness is reduced, the higher strength per unit thickness may be employed in the capacitor design.

A series multiple electrode assembly constructed according to this invention was fabricated. The dielectric material employed was a piezoelectric ceramic having a dielectric constant of about 1700 and a temperature characteristic which was X7R. The gap between the spaced-apart electrodes was 0.030 inches and 0.015 inches between the floating and spaced-apart electrodes. The electrode thickness was 0.1–0.2 mils. The voltage rating was 200 pf and the capacitor had a breakdown rating in excess of 15,000 volts. The construction included four active electrodes, five printed layers and six total layers. The capacitor was rectangular in shape and its size was approximately 0.5×0.4×0.1 inches. A 3×3 matrix was employed.

Some measurements were made for capacitors constructed in accordance with this invention. Table 1 shows the relationship of capacitance and dielectric withstanding voltage for three sets of five samples each of similarly constructed capacitors.

TABLE 1

| Avg. Capacitance (pf) | DWV (volts) |
| --- | --- |
| 110.9 | 7,520 |
| 80.6 | 13,260 |
| 47.6 | 15,900 |

As another feature of this invention, it has been found that when piezoelectric material is used as the dielectric medium in a multi-layered ceramic capacitor assembly and the assembly is subjected to vibration, unwanted spurious signals are generated. The amplitude of these spurious signals can interfere with proper operation of the circuitry in which they are placed. In accordance with this invention, the series construction for the multi-layered ceramic capacitors can limit the amplitude of such spurious signals to be below interfering levels generated. As the number of series gaps is increased, further pinning of piezoelectric vibratory action is achieved with a corresponding reduction in capacitance value. The capacitor value may be increased by adding additional stacks to provide a desired value.

The piezoelectric response of capacitors of the present invention was measured and compared with prior art commercially available parallel multiple electrode capacitors.

The capacitance and loss (tan δ), at various frequencies, were measured using a Hewlett Packard Model 4270A automatic capacitance bridge of a HP Model 4274A Multi-Frequency LCR Meter.

A Keithly Instrument Model 240A in high voltage supply and/or the HP Model 427A automatic capacitance bridge were used to pole the multilayer capacitors. The capacitors were poled in air at room temperature by applying various DC fields for various time periods. The piezoelectric properties were determined with a Berlincourt $d_{33}$ meter.

Table 2 shows the effect of pinning achieved in a series construction with a poling voltage of 100 V.D.C. The table illustrates the reduction in piezoelectric effect achieved with a single gap series construction.

TABLE 2

| Capacitance Value | Construction | $d_{31}$ | |
| --- | --- | --- | --- |
| 56000 pf | Parallel; 21 layers, 1.2 mil dielectric thickness; size 0.18 × 0.08 inches | $30 \times 10^{-12}$ | $\frac{\text{coulombs}}{\text{newton}}$ |
| 47000 pf | Series; 9 layers 2.2 mil dielectric thickness size 0.25 × 0.21 inches | $4.5 \times 10^{-12}$ | |

These measurements demonstrate the marked reduction in dielectric activity achieved with the series multiple electrode capacitor construction.

Referring to FIG. 6, other limitations on piezoelectric activity is achieved in the series construction by control of the longitudinal gaps between parallel electrodes 62. The material in the longitudinal gaps, the gap size, the border size around the gaps and the shape of the gaps all may be controlled to influence the piezoelectric effect of the dielectric.

Although the illustrations of this invention has set forth specific dimensions, it is understood that numerous dimensional parameters may be varied. For instance, the gap between adjacent spaced-apart electrodes may be equal to the sum of the distances between the floating electrode and the corresponding two-spaced apart electrodes. The relative dimensions may also be varied. Additionally, although all electrodes are illustrated to be in even rows, no such dimensional restriction is required, and any arrangement of spaced-apart and floating electrodes may be used. Still further, although the invention is illustrated by depositing the spaced-apart and floating electrodes on separate layers before sintering, other processes may be employed to form said electrodes within a single ceramic dielectric medium.

What is claimed is:

1. A high voltage non-discoidal multiple electrode series capacitor comprising a dielectric material and a plurality of first and second planar electrodes embedded therein, said structure of said dielectric material and said first and second electrodes being integral and having a substantially rectangular shape having width, depth and height dimensions, said plurality of first planar electrodes having dimensions in the width and depth directions of said structure being spaced apart and being located in a first row extending across the width of said structure with the outer electrodes of the row of said plurality of first electrodes extending to each side edge of said dielectric material, a first space formed between each pair of adjacent first planar electrodes, each of said first spaces being substantially uniform, said plurality of second planar electrodes having dimensions in the width and depth directions of said structure being spaced apart and being located in a second row extending across the width of the structure with a second space formed between each pair of adjacent second planar electrodes, the number of said plurality of second planar electrodes being one less than the number of said plurality of first planar electrodes, said first and second rows being parallel to and in alignment with each other and spaced apart by a gap from each other with each of said second planar electrodes bridging a respective one of said first spaces between said first electrodes, electrical junction means connected at the side edges of said dielectric to provide an electrical junction at each side edge of said outer electrodes of said first row and for said multiple electrode series capacitor, said multiple electrode series capacitor being formed by a plurality of series capacitor subsections with each subsection being formed by a pair of first electrodes and a bridging second electrode, wherein each of said first planar electrodes is of substantially uniform size and the capacitance value of said capacitor subsections is substantially equal.

2. A high voltage multiple series capacitor as set forth in claim 1 wherein each of said second planar electrodes is of substantially uniform size.

3. A high voltage multiple series capacitor as set forth in claim 2, wherein each of said first and second planar electrodes is of substantially uniform size.

4. A high voltage multiple series capacitor as set forth in claim 2, wherein each of said second spaces is of uniform size.

5. A high voltage multiple series capacitor as set forth in claim 1, wherein each of said plurality of first and second planar electrodes comprise a plurality of separated parallel co-planar electrodes extending in the depth dimension of said structure.

6. A high voltage multiple series capacitor as set forth in claim 5, wherein said plurality of separate parallel co-planar electrodes are spaced apart from each other.

7. A high voltage multiple series capacitor as set forth in claim 1, wherein said plurality of first electrodes are formed in one dielectric layer and said plurality of second electrodes is formed in a separate dielectric layer, said layers being stacked together and processed to form said monolithic structure.

8. A high voltage multiple electrode series capacitor as set forth in claim 7, wherein said capacitor comprises a plurality of respective sets of rows, said plurality of first and second planar electrodes spaced apart by respective gaps forming a plurality of layers in the height dimension of said structure, with said electrical junction at the side edges connected to a plurality of respective outer ones of said first electrodes located at said side edges to form a plurality of layers for said multiple series monolithic capacitor.

9. A high voltage multiple electrode series capacitor as set forth in claim 1, wherein said capacitor comprises a plurality of respective sets of rows said plurality of first and second planar electrodes spaced apart by respective gaps forming a plurality of layers in the height dimension of said structure, with said electrical junction at the side edges connected to a plurality of respective outer ones of said first electrodes located at said side edges to form a plurality of layers for said multiple series monolithic capacitor.

10. A high voltage multiple electrode series capacitor as set forth in claim 1, wherein said ceramic material is formed of a piezoelectric material, wherein the first and second electrodes and the respective gap therebetween pins the piezoelectric materials located in said gap, said gap being sized to limit the amount of piezoelectric activity occurring in said gap to limit the amplitude of spurious signals generated to be below a predetermined interfering level when the capacitor is subject to vibratory motion.

* * * * *